United States Patent Office 2,769,846
Patented Nov. 6, 1956

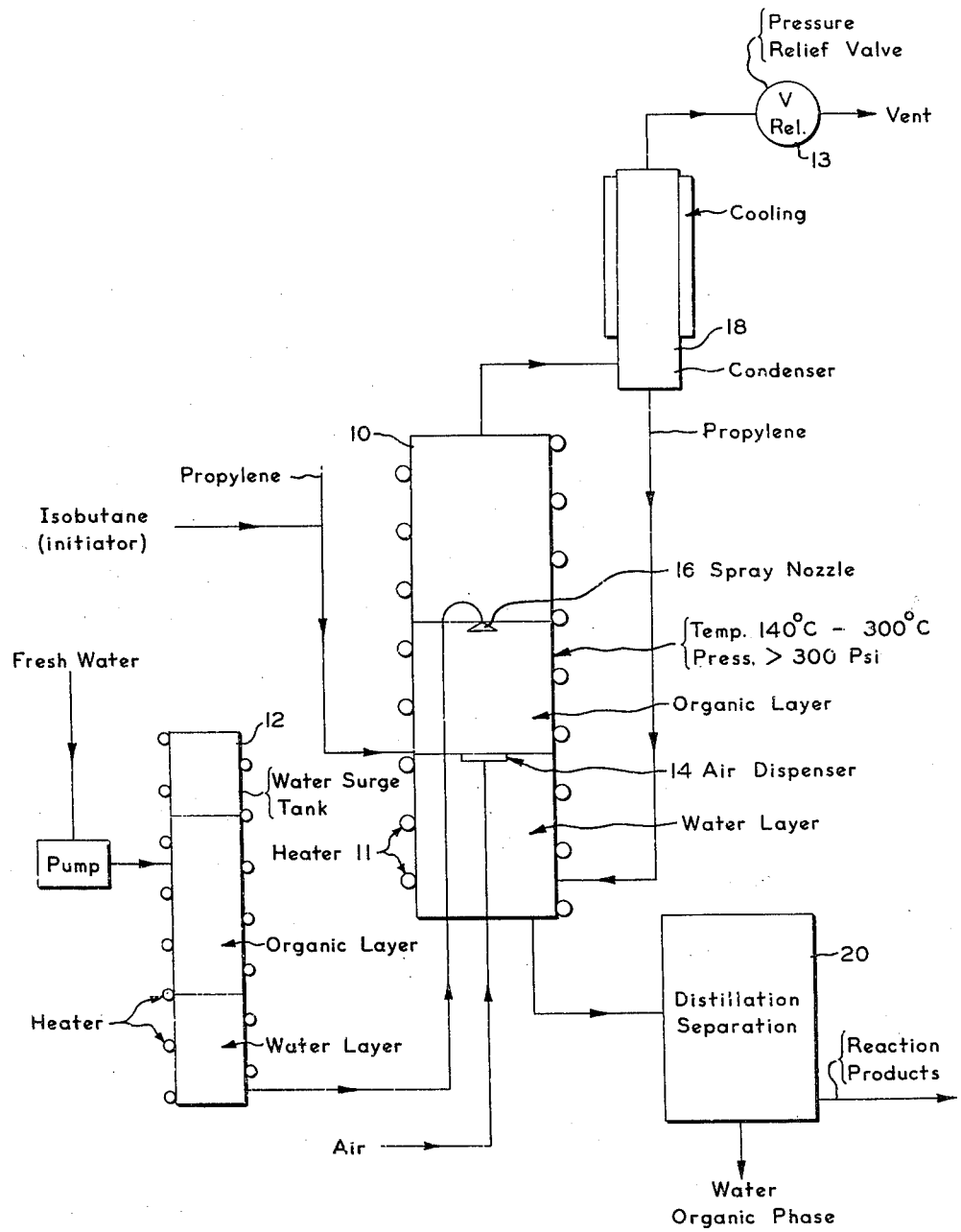

2,769,846

PRODUCTION OF CHEMICALS

Albert Di Nardo, Jamaica Plain, and James H. Gardner and Nat C. Robertson, Cambridge, Mass., assignors to National Research Corporation, Cambridge, Mass., a corporation of Massachusetts Application May 4, 1953, Serial No. 352,696

4 Claims. (Cl. 260—635)

This invention relates to the production of chemicals and more particularly to the production of oxygenated hydrocarbons such as glycols.

A principal object of the present invention is to produce water-soluble reaction products, in good yields, by the liquid phase oxidation of hydrocarbons.

Another object of the present invention is to provide an improved process for producing oxygenated hydrocarbons by oxidizing normally gaseous hydrocarbons in an organic solvent with an elemental-oxygen-containing gas.

Still another object of the invention is to provide improved processes for the manufacture of glycols from olefins.

Still another object of the invention is to provide a process of the above type which is particularly adapted to the production of propylene glycol by the oxidation of propylene.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which is a flow sheet illustrating one preferred embodiment of the invention.

In the present invention a hydrocarbon is oxidized to give a high yield of water-soluble primary oxidation products by oxidation in the liquid phase at a relatively high pressure. In one preferred form of the invention the hydrocarbon is a gaseous olefin which is converted to the corresponding glycol. A specific preferred embodiment includes propylene as the olefin to be converted to propylene glycol.

The oxidation is preferably achieved by passing an elemental-oxygen-containing gas upwardly through a liquid phase containing the hydrocarbon to be oxidized. This liquid phase preferably includes a solvent for the hydrocarbon to be oxidized. This solvent is preferably relatively inert to oxygen under the reaction conditions, and is preferably relatively water-insoluble. A preferred solvent is benzene. The oxygen-containing gas is preferably air which is introduced through an air dispenser near the bottom of the hydrocarbon phase in the reactor. With this arrangement, the oxidation zone is that portion of the liquid phase above the air dispenser.

In order to provide for the rapid removal of the water-soluble reaction products from the oxidation zone, this oxidation zone is continuously extracted with water. This water extraction is preferably achieved by spraying water, in fine droplets, into the top of the solvent (e. g., benzene) phase, these droplets, due to their higher specific gravity, sinking down through the benzene and dissolving the water-soluble reaction products. The water droplets then carry these dissolved reaction products out of the oxidation zone and into a water phase at the bottom of the reactor. This continuous extraction has a two-fold advantage in that (1) the water-soluble primary oxidation products formed are removed before they can undergo any further destructive oxidation, and (2) it minimizes the formation of polymeric materials.

It is also preferred that the reaction be initiated with a small quantity of isobutane or other saturated hydrocarbon with three or more carbon atoms in the molecule so that lower operating temperatures are obtainable. In a preferred embodiment of the invention the conditions of reaction are so adjusted that polymer formation is minimized. In one aspect of the invention, polymerization may be substantially eliminated by the use of excess oxygen in the oxidation zone so that the vent gases contain a small amount of excess oxygen. This excess oxygen is maintained at less than the explosive limit for the vent gases.

The invention will be particularly described in connection with the oxidation of propylene to propylene glycol, it being understood that the invention is by no means limited by this specific example. One preferred embodiment of this aspect of the invention is set forth in the following nonlimiting example, the reference numerals indicating the appropriate sections of the flow sheet illustrated in the drawing.

*Example 1*

The solvent, 1000 mls. of benzene, along with 1200 mls. of water containing 1.4 grams of a manganese propionate catalyst are charged to a high pressure reactor 10. The reactor 10, now containing a lower layer of water and an upper layer of benzene is sealed and then charged with 85 grams of propylene and 20 grams of isobutane as an initiator. The reactor is put under about 300 p. s. i. g. of nitrogen and brought up to the operating temperature within the range of 210°–230° C. by means of a heater schematically indicated at 11. The pressure relief valve 13 is then adjusted to maintain a pressure of about 800 to 850 p. s. i. g. A water surge tank 12 is charged with fresh water containing a manganese propionate catalyst. The water solution, on entering the surge tank, is passed downwardly through a benzene layer so as to saturate the water with benzene. The surge tank is then brought up to within the range of the operating temperature and pressure of the reactor. Nitrogen is then bubbled through an air disperser 14 located at the water-benzene interface in the reactor 10 until the pressure controller (i. e., the pressure relief valve) comes to equilibrium. At this point, the nitrogen feed is stopped and a steady rate of air feed of between 4 and 5 standard cubic feet per hour is commenced. Propylene is fed to the reactor at an average rate of about 80 grams per hour to make up for the loss of propylene in the purge gas and for that which reacts. When the feed of air and propylene is started, the extraction of the oxidizing medium with benzene-saturated water solution is commenced. The water solution enters into the top of the upper benzene solvent layer through a spray nozzle 16 at a rate of approximately 5000 mls. per hour. The finely divided water particles, in settling down through the oxidation zone, scrub out water-soluble oxygenated compounds and carry these compounds into the lower layer of water in the reactor. The lower water layer, containing the reaction products, is continuously withdrawn to maintain the proper water-benzene level in the reactor. Condenser 18 continuously refluxes propylene back to the reactor 10 so as to provide for high conversion of the propylene to oxygenated products.

During a run of almost 4 hours duration, 318 grams of propylene were fed to the reactor. A total of 14.8 liters of a benzene-saturated water solution (containing 14 grams of a manganese propionate catalyst) were employed in extracting the benzene layer.

After termination of the run, the products are recovered by employing any of the well-known separation techniques, such as a distillation step indicated at 20. The above run produced the following materials, the yields of which are indicated as grams of product per 100 grams of hydrocarbon (propylene and isobutane) consumed:

| | |
|---|---|
| Propylene glycol | 88.50 |
| Polymeric material | 13.30 |
| Acetone | 8.50 |
| Acids (principally acetic and formic) | 32.68 |
| Alcohols (principally methyl and allyl) | 5.27 |
| Aldehydes | 3.55 |
| Carbon oxides | 33.70 |
| Other materials | 3.36 |
| Carbon efficiency, percent | 74.8 |
| Approximate glycol yield, percent | [1] 49.0 |

[1] Based on propylene only.

In the above specific example, the use of water extraction has been found to greatly increase the yield of glycol and to greatly decrease the amount of polymeric materials produced per hundred grams of olefin consumed.

When fresh water extraction is employed, the surge tank 12 preferably contains an upper benzene layer and a lower aqueous layer which are heated to the operating temperatures of the reactor. The lower layer thus comprises benzene-saturated water which may also include a buffer to furnish a solution having pH 6 and a small amount of manganese propionate catalyst. The aqueous solution, if not saturated with the benzene solvent, would tend eventually to dissolve the benzene from the reactor. However, benzene can be separately fed to the reactor, if desired, to make up benzene losses.

The contents of the surge tank are preferably heated to the operating temperature of the reactor so that, on entering the reactor through the spray nozzle 16, no deleterious temperature variation will occur. If desired, water can be added in the form of steam, this steam condensing in the benzene phase to add heat to the reactor. In this case the condensed steam forms water droplets which pass downwardly through the reaction zone.

The water-spray nozzle 16 is preferably located at the top of the solvent layer in the reactor so that an efficient scrubbing of the solvent layer will be accomplished. The speed with which the oxidizing medium is scrubbed may be varied over a wide range. Satisfactory results have been obtained when the oxidizing medium is scrubbed with around 5000 mls. of the aqueous solution per hour per 80 grams of propylene fed to the reactor.

The air disperser 14 is preferably located at the solvent-water interface or slightly above this interface. This positioning of the air disperser above the water layer prevents the extracted oxidation products in the water layer from being further exposed to the oxidizing gas and thereby prevents further destructive oxidation of the extracted products.

While the above example illustrates one preferred method of continuously extracting the water soluble oxygenated compounds from the oxidizing medium, several other suitable methods may be employed. One of these is illustrated in the following nonlimiting example:

*Example II*

A similar oxidation of propylene was carried out under essentially the same conditions (of temperature, catalyst, initiator, pressure, etc.) as were present in Example I. However, in this example, a closed circuit extraction was employed (i. e., the extracted water from the lower water layer was pumped back to the water surge tank 12 and was used for further extraction of the benzene layer in the reactor 10). In this case the scrub water contained a small amount of a buffer solution to prevent undue accumulation of acids in the recycle scrub water. One preferred buffer comprises 205 grams of a 10% phosphate buffer solution having a pH of 6 to 7, this amount of buffer being used with an initial water charge of 1200 mls.

The products obtained from the reaction were isolated and the quantities of each are indicated below as grams of product per 100 grams of hydrocarbon (isobutane and propylene) consumed:

| | |
|---|---|
| Propylene glycol | 61.60 |
| Polymeric material | 26.10 |
| Acetone | 3.52 |
| Acids (principally acetic and formic) | 31.81 |
| Alcohols (principally methyl and allyl) | 8.04 |
| Carbon oxides | 49.90 |
| Other materials | 7.02 |
| Carbon efficiency, percent | 58.3 |
| Approximate glycol yield, percent | [1] 34.0 |

[1] Based on propylene only.

In the above two examples water extraction of the reaction products was employed. As mentioned, this is a preferred embodiment of the invention. When the oxidation is accomplished, without using this preferred step, only fair glycol yields are obtained, as illustrated in the following nonlimiting example:

*Example III*

The reactor is charged with benzene, water, etc. as in Example I, and the oxidation is conducted under essentially the same conditions as employed in Example I. However, in this case no scrubbing water is fed to the reactor during the run, but some buffer was added to the initial water charge to maintain the water in the reactor at a pH of about 6.

After termination of the run, the reaction products are discharged from the reactor and separated by conventional techniques. On isolation of the reaction products, the following quantities of materials were obtained, these being indicated as grams of product per 100 grams of hydrocarbon (propylene and isobutane) consumed:

| | |
|---|---|
| Propylene glycol | 29.40 |
| Polymeric materials | 37.82 |
| Acetone | 10.70 |
| Acids (principally acetic and formic) | 26.32 |
| Alcohols (principally methyl and allyl) | 5.76 |
| Carbon oxides | 60.60 |
| Other materials | 8.95 |
| Carbon efficiency, percent | 42.0 |
| Approximately glycol yield, percent | [1] 16.2 |

[1] Based on propylene only.

While several specific examples of the present invention have been given above, they are subject to wide variations without departing from the scope thereof. For example, the manganese propionate (of about 0.1 percent concentration) is a well-known oxidation catalyst. Other manganous salts or salts or oxides of metals of variable valence are equally effective. An important purpose of utilizing an oxidation catalyst is to prevent the creation of large concentrations of dangerously explosive hydroperoxides. It is believed that the metal walls of the reaction vessel may have sufficient catalytic effect to prevent the formation of such hydroperoxides. Similarly, while the use of a phosphate buffer solution (which is obtained by titrating a solution of trisodium phosphate with phosphoric acid) is quite effective, numerous other well known buffer solutions may be employed. Equally, the pH of the solution may be kept above 5 by the use of an alkali such as sodium hydroxide which can be added as required during the reaction. As is apparent from the above description, the use of a buffer is not necessary when large quantities of fresh water are used for scrubbing the reaction zone. While benzene has been illustrated as being a preferred oxygen-inert solvent, other relatively water-insoluble organic solvents can be used. Examples of such other oxygen-inert solvents are fluorinated hydrocarbons, both aliphatic and aromatic, liquid diphenyl and terphenyl or mixtures of these.

The range of operating pressures and operating temperatures is quite broad and can be varied within considerable limits. With regard to pressure it should be pointed out that it is preferably maintained above 300 p. s. i. g., but that considerably higher pressures may be utilized where design considerations indicate the desirability of such higher pressures. The temperature within the reactor may be varied between about 140° C. and 300° C., the temperature remaining below the critical temperature of the organic solvent in all cases.

The specific procedures described for the oxidation of propylene to propylene glycol can be applied to olefins in general. Other olefins which may be oxidized to their respective glycols are ethylene, the butylenes, and the amylenes. It is equally applicable to the oxidation of saturated hydrocarbons to obtain valuable primary oxidation products such as alcohols, ketones, and aldehydes. Where these hydrocarbons are liquid at the operating temperature and pressure, it is not necessary to employ a solvent in the reaction zone.

As will be noted, in Example II, a substantial amount of polymeric materials was produced. The formation of this polymeric material can be substantially inhibited by maintaining an excess of oxygen in the oxidizing medium. This excess of oxygen is brought about by feeding oxygen in slight excess over the amount consumed during the oxidation. One such method of operation is set forth in the following nonlimiting example:

*Example IV*

An oxidation run, similar to that described in Example II, was practiced, the conditions of operation being essentially the same as the Example II conditions. However, oxygen feed was adjusted in this case so that only about 82.0 percent consumption of oxygen resulted as contrasted with the 96.0 percent consumption in Example II. This was achieved by feeding oxygen (i. e., air) at an average rate of 6.7 s. c. f./hour as contrasted with 4.7 s. c. f./hour for Example II. In this connection it should be pointed out that the outgases were continually analyzed so as to maintain their oxygen content below 10% to prevent creation of explosive concentrations of oxygen in these outgases. This oxygen concentration was preferably maintained at about 5% in the outgases. The products obtained from this run, indicated in grams of product per 100 grams of hydrocarbons (isobutane and propylene) consumed are as follows:

| | |
|---|---|
| Propylene glycol | 72.50 |
| Polymeric material | 19.58 |
| Acetone | 7.61 |
| Acids (principally acetic and formic) | 30.59 |
| Alcohols (principally methyl and allyl) | 2.22 |
| Aldehydes | 1.29 |
| Carbon oxides | 56.54 |
| Other materials | 4.85 |
| Carbon efficiency, percent | 62.9 |
| Approximate glycol yield, percent | [1] 40.0 |

[1] Based on propylene only.

Since certain changes may be made in the above process without departing from the scope of the invention herein involved, it is intended that all matter contained in the above description, or shown in the accompanying drawing, shall be interpreted as illustrative and not in a limiting sense.

What is claimed is:

1. A method of producing oxygenated hydrocarbons which comprises the steps of passing an elemental-oxygen-containing gas upwardly through a liquid hydrocarbon which can be oxidized to water-soluble oxygenated products, maintaining said liquid hydrocarbon under pressure and at a temperature above about 140° C. while said gas passes therethrough to oxidize said liquid hydrocarbon to primary oxidation products, passing water droplets downwardly through the major portion of said liquid hydrocarbon to extract the water-soluble oxidation products therefrom, and collecting the water-soluble oxidation products as an aqueous phase below the point of introduction of the elemental-oxygen-containing gas.

2. A method of producing oxygenated hydrocarbons which comprises the steps of dissolving a hydrocarbon which can be oxidized to water-soluble oxygenated products in an organic solvent which is substantially inert to oxygen at temperatures above about 140° C., passing an elemental-oxygen-containing gas into said solution while said solution is held under pressure to oxidize the hydrocarbon to primary oxidation products, maintaining said solution at a temperature above about 140° C. while said gas passes therethrough, passing water droplets downwardly through the major portion of said solution to extract the water-soluble oxidation products therefrom, and collecting the water-soluble oxidation products as an aqueous phase below the point of introduction of the elemental-oxygen-containing gas.

3. A method of forming a glycol by the direct oxidation of a corresponding normally gaseous olefin with a low yield in polymeric material per unit of olefin consumed which comprises the steps of dissolving said olefin in an organic solvent which is inert to oxygen at temperatures above about 140° C., passing an elemental-oxygen-containing gas into said solution while said solution is held under pressure to oxidize said olefin to said glycol, maintaining said solution at a temperature above about 140° C. while said gas passes therethrough, passing finely divided water droplets downwardly through the major portion of said solution to extract said glycol therefrom, and collecting said glycol as an aqueous phase below the point of introduction of the elemental-oxygen-containing gas.

4. A method of forming propylene glycol by the direct oxidation of propylene with a high yield of glycol per unit of propylene consumed which comprises the steps of dissolving propylene in benzene, passing an elemental-oxygen-containing gas into said solution while said solution is held under pressure to oxidize propylene to propylene glycol, maintaining said solution at a temperature above about 140° C. while said gas passes therethrough, passing finely divided water droplets downwardly through the major portion of said solution to extract propylene glycol therefrom, and collecting said propylene glycol as an aqueous phase below the point of introduction of the elemental-oxygen-containing gas.

References Cited in the file of this patent

UNITED STATES PATENTS

| | | |
|---|---|---|
| 2,249,986 | Smith | July 22, 1941 |
| 2,565,087 | Porter et al. | Aug. 21, 1951 |
| 2,644,837 | Schweitzer | July 7, 1953 |